(12) United States Patent
Vig et al.

(10) Patent No.: US 7,787,625 B2
(45) Date of Patent: Aug. 31, 2010

(54) QKD CASCADED NETWORK WITH LOOP-BACK CAPABILITY

(75) Inventors: Harry Vig, North Billerica, MA (US); Audrius Berzanskis, Cambridge, MA (US)

(73) Assignee: MagiQ Technologies, Inc., New York, NY (US)

( * ) Notice: Subject to any disclaimer, the term of this patent is extended or adjusted under 35 U.S.C. 154(b) by 930 days.

(21) Appl. No.: 11/629,247

(22) PCT Filed: Jun. 30, 2005

(86) PCT No.: PCT/US2005/023135
§ 371 (c)(1),
(2), (4) Date: Dec. 11, 2006

(87) PCT Pub. No.: WO2006/014298
PCT Pub. Date: Feb. 9, 2006

(65) Prior Publication Data
US 2008/0292095 A1    Nov. 27, 2008

Related U.S. Application Data

(60) Provisional application No. 60/584,970, filed on Jul. 2, 2004.

(51) Int. Cl.
*H04L 9/00* (2006.01)
(52) U.S. Cl. .......... 380/256; 713/150; 713/189; 380/255; 380/257; 380/259; 380/277; 380/278; 380/281; 380/283

(58) Field of Classification Search .......... 713/150, 713/189; 380/255–257, 259, 277–278, 281, 380/283
See application file for complete search history.

(56) References Cited

U.S. PATENT DOCUMENTS

| | | | |
|---|---|---|---|
| 7,403,623 B2 * | 7/2008 | Cerf et al. | 380/278 |
| 2003/0012481 A1 | 1/2003 | Fant et al. | |
| 2003/0035175 A1 | 2/2003 | Wu et al. | |
| 2003/0048978 A1 | 3/2003 | Chen et al. | |
| 2004/0208510 A1 | 10/2004 | Ohara | |
| 2006/0013396 A1 * | 1/2006 | Kollmitzer | 380/256 |

FOREIGN PATENT DOCUMENTS

WO    WO 03058290    7/2003

OTHER PUBLICATIONS

Toliver et al, Experimental Investigation of Quantum Key Distribution Through Transparent Optical Switch Elements, IEEE PhotonicsTechnology Letters, vol. 15, No. 11, pp. 1669-1671, 2003.

* cited by examiner

*Primary Examiner*—Nasser Moazzami
*Assistant Examiner*—Ghazal Shehni
(74) *Attorney, Agent, or Firm*—Opticus IP Law, PLLC

(57) ABSTRACT

A quantum key distribution (QKD) cascaded network with loop-back capability is disclosed. The QKD system network includes a plurality of cascaded QKD relays each having two QKD stations Alice and Bob. Each QKD relay also includes an optical switch optically coupled to each QKD station in the relay, as well as to input ports of the relay. In a first position, the optical switch allows for communication between adjacent relays and in a second position allows for pass-through communication between the QKD relays that are adjacent the relay whose switch is in the first position.

10 Claims, 4 Drawing Sheets

US 7,787,625 B2

QKD CASCADED NETWORK WITH LOOP-BACK CAPABILITY

CLAIM OF PRIORITY

This patent application claims priority from U.S. Provisional Patent Application Ser. No. 60/584,970, filed on Jul. 2, 2004.

TECHNICAL FIELD OF THE INVENTION

The present invention relates to quantum cryptography, and in particular relates to quantum key distribution (QKD) system networks and QKD stations for use therein.

BACKGROUND ART

Quantum key distribution involves establishing a key between a sender ("Alice") and a receiver ("Bob") by using weak (e.g., 0.1 photon on average) optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," *Proceedings of the International Conference on Computers, Systems and Signal Processing*, Bangalore, India, 1984, pp. 175-179 (IEEE, New York, 1984). Specific QKD systems are described in publications by C. H. Bennett et al entitled "Experimental Quantum Cryptography." *J. Cryptology*, (1992) 5: 3-28, and by C. H. Bennett entitled "Quantum Cryptography Using Any Two Non-Orthogonal States", *Phys. Rev. Lett.* 68 3121 (1992). The general process for performing QKD is described in the book by Bouwmeester et al., "The Physics of Quantum Information," Springer-Verlag 2001, in Section 2.3, pages 27-33.

The above-mentioned publications by Bennett describe a so-called "one-way" QKD system wherein Alice randomly encodes the polarization or phase of single photons, and Bob randomly measures the polarization or phase of the photons. The one-way system described in the Bennett 1992 paper and incorporated by reference herein is based on a shared interferometric system. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized to within a few tens of nanoseconds during transmission to compensate for thermal drifts.

U.S. Pat. No. 6,438,234 to Gisin (the '234 patent), which patent is incorporated herein by reference, discloses a so-called "two-way" QKD system that employs an autocompensating interferometer first invented by Dr. Joachim Meier of Germany and published in 1995 (in German) as "Stabile Interferometrie des nichtlinearen Brechzahl-Koeffizienten von Quarzglasfasern der optischen Nachrichtentechnik," Joachim Meier.—Als Ms. gedr.—Düsseldorf: VDI-Verl., Nr. 443, 1995 (ISBN 3-18-344308-2). Because the Meier interferometer is autocompensated for polarization and thermal variations, the two-way QKD system based thereon is less susceptible to environmental effects than a one-way system.

It will be desirable to one day have multiple QKD links woven into an overall QKD network that connects its QKD endpoints via a mesh of QKD relays or routers. Example QKD networks are discussed in the publication by C. Elliot, New Journal of Physics 4 (2002), 46.146.12, and also in PCT patent application publication no. WO 02/05480, which publication and PCT patent application are incorporated by reference herein.

When a given point-to-point QKD link within the relay fails—e.g. by a fiber being cut or from too much eavesdropping or noise—that link is abandoned and another used instead. This type of QKD network can be engineered to be resilient even in the face of active eavesdropping or other denial-of-service attacks.

Such QKD networks can be built in several ways. In one example, the QKD relays only transport keying material. After relays have established pair-wise agreed-to keys along an end-to-end point, e.g., between the two QKD endpoints, they employ these key pairs to securely transport a key "hop by hop" from one endpoint to the other. The key is encrypted and decrypted using a onetime-pad with each pairwise key as it proceeds from one relay to the next. In this approach, the end-to-end key will appear in the clear within the relays' memories proper, but will always be encrypted when passing across a link. Such a design may be termed a "key transport network."

Alternatively, QKD relays may transport both keying material and message traffic. In essence, this approach uses QKD as a link encryption mechanism, or stitches together an overall end-to-end traffic path from a series of QKD-protected tunnels.

Such QKD networks have advantages that overcome the drawbacks of point-to-point links enumerated above. First, they can extend the geographic reach of a network secured by quantum cryptography, since wide-area networks can be created by a series of point-to-point links bridged by active relays. Links can be heterogeneous transmission media, i.e., some may be through fiber while others are free-space. Thus, in theory, such a network could provide fully global coverage.

Second, they lessen the chance that an adversary could disable the key distribution process, whether by active eavesdropping or simply by cutting a fiber. A QKD network can be engineered with as much redundancy as desired simply by adding more links and relays to the mesh.

Third, QKD networks can greatly reduce the cost of large-scale interconnectivity of private enclaves by reducing the required $(N\times(N-1))/2$ point-to-point links to as few as N links in the case of a simple star topology for the key distribution network.

Such QKD networks do have their own drawbacks, however. For example, their prime weakness is that the relays must be trusted. Since keying material and—directly or indirectly—message traffic are available in the clear in the relays' memories, these relays must not fall into an adversary's hands. They need to be in physically secured locations and perhaps guarded if the traffic is truly important. In addition, all users in the system must trust the network (and the network's operators) with all keys to their message traffic. Thus, a pair of users with unusually sensitive traffic must expand the circle of those who can be privy to it to include all machines, and probably all operators, of the QKD network used to transport keys for this sensitive traffic.

U.S. patent application Ser. No. 11/152,875, entitled "QKD System Network," filed on Jun. 15, 2005, (the '875 application), and also filed as a corresponding PCT Patent Application on Jul. 28, 2005, and incorporated by reference herein, discloses a QKD network system that includes a cascaded arrangement of QKD stations that utilize switches. The switches allow for a choice of pathways between points in the network. The '875 application also describes approaches for communicating keys between stations in the network. In QKD networks, such as those described in the '875 application, it would be useful to have a way to perform a check of the Alice and Bob units in each box without fear of outside interference through the externally accessible fiber links, while also allowing pass-through communication between relays in a QKD-based network.

SUMMARY OF THE INVENTION

An aspect of the invention is a QKD cascaded network with loop-back capability. The QKD system network includes a plurality of cascaded QKD relays each having two QKD systems Alice and Bob therein. Each QKD relay also includes an optical switch. The optical switch is optically coupled to each QKD station in the relay, as well as to the input ports of the relay. In a first position, the optical switch allows for communication between adjacent relays. In a second position, the optical switch allows for pass-through communication between the QKD relays that are adjacent the relay whose switch is in the first position. Also in the second position, the optical switch allows for communication between the QKD stations within the relay. This "loop back" configuration allows for diagnostic measurements to be made of one or both of the QKD stations via an optical path that is entirely within the relay station enclosure.

These and other aspects of the invention are described in greater detail below.

Figure 1:
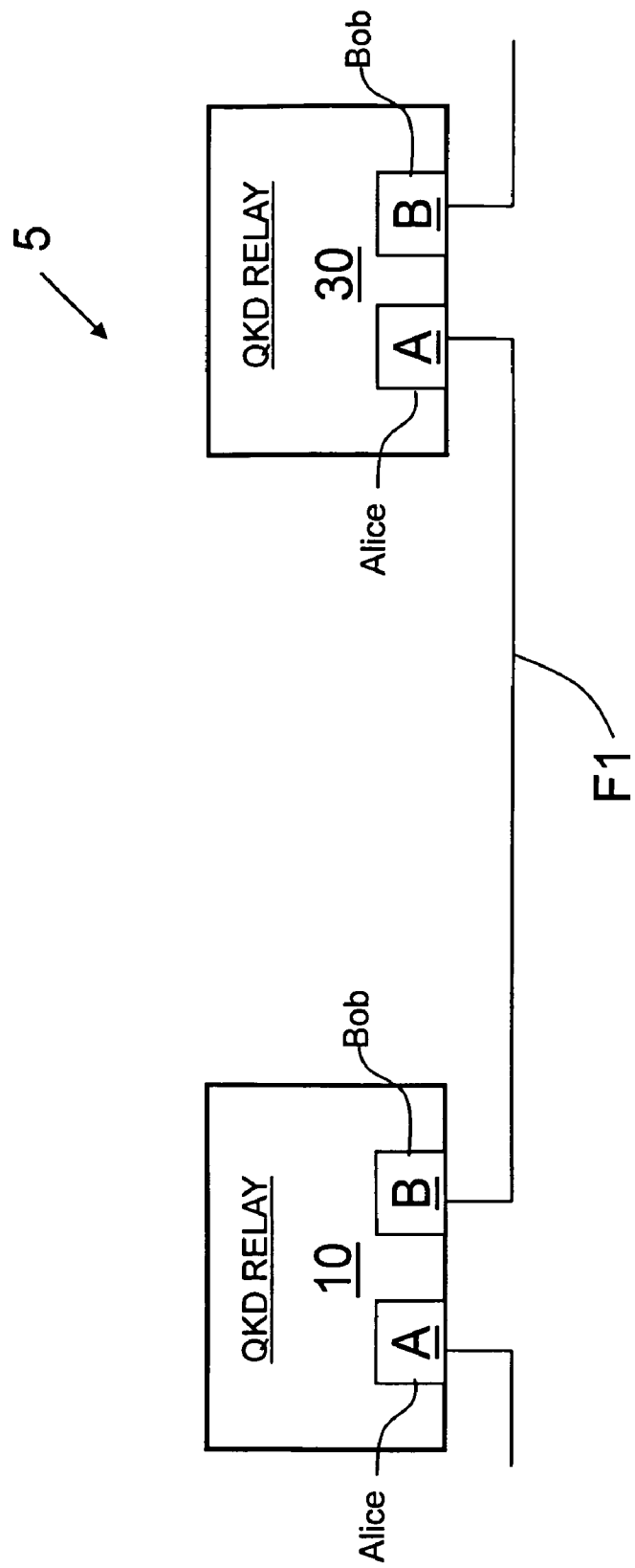
FIG. 1 is a schematic diagram of a 50 km link as part of a QKD cascaded network, wherein each QKD relay (box) 10 and 30 includes an Alice A and a Bob B.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

FIG. 1 is a schematic diagram of a 50 km link as part of a QKD cascaded network 5, wherein the network includes QKD relays ("boxes") 10 and 30 that each includes QKD stations Alice A and Bob B. QKD boxes 10 and 30 are operably connected via fiber link F1. In the operation of the QKD network, the Alice of one box communicates with the Bob in the adjacent box in the cascaded network.

Figure 2:
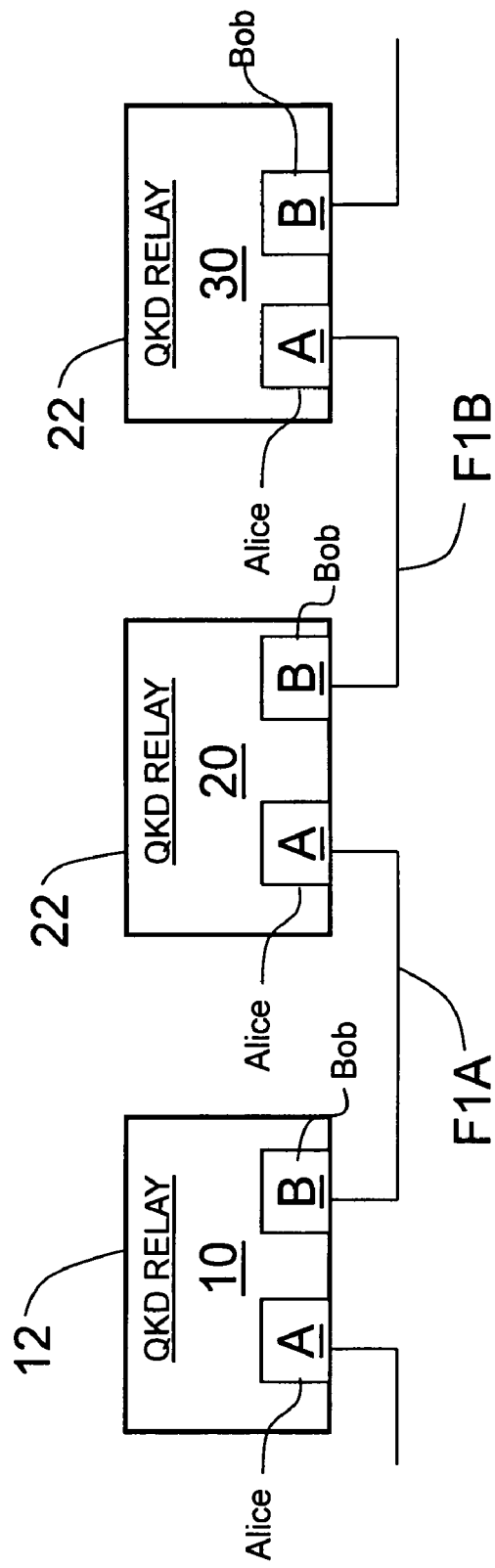
FIG. 2 is a schematic diagram of the QKD cascaded network of FIG. 1, but with a QKD box 20 similar to boxes 10 and 30 interposed between boxes 10 and 30.

If the QKD network 5 requires redundancy and self-checking, then another QKD box 20 is added in between boxes 10 and 30, as illustrated in FIG. 2. Now, fiber link F1 is divided into two sections F1A and F1B. For the purpose of discussion, it is assumed that the distance from box 10 to box 20 and the distance from box 20 to box 30 is 25 km. Also, in an example embodiment, boxes 10, 20 and 30 have respective enclosures 12, 22 and 32, and the boxes are designed to be tamperproof.

Figure 3:
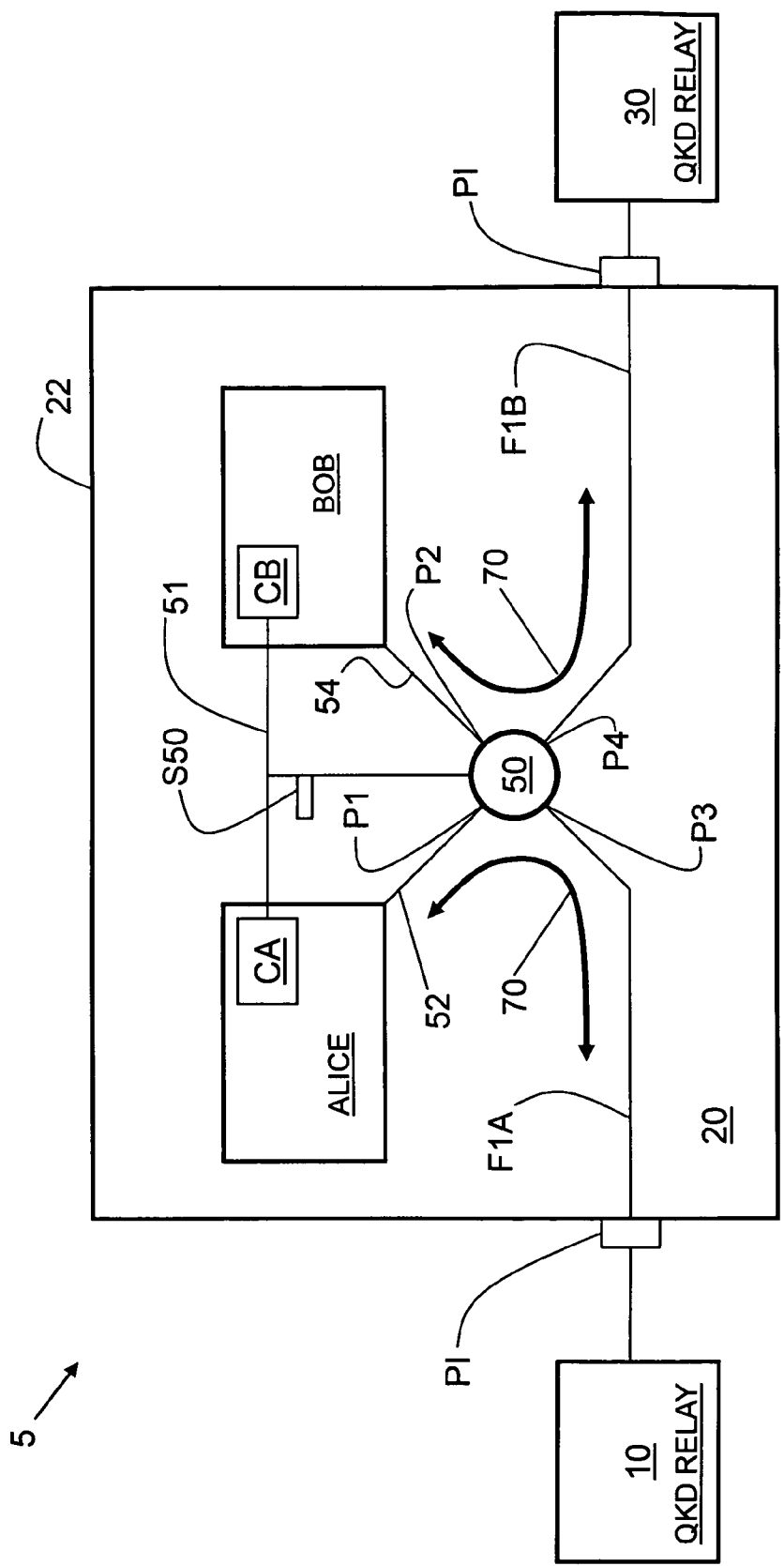
FIG. 3 is a schematic diagram of the QKD cascaded network of FIG. 2, showing details of QKD box 20 with a 2×2 optical switch shown in a first (open) position that allows for cascaded QKD communication between boxes 10, 20 and 30.
Figure 4:
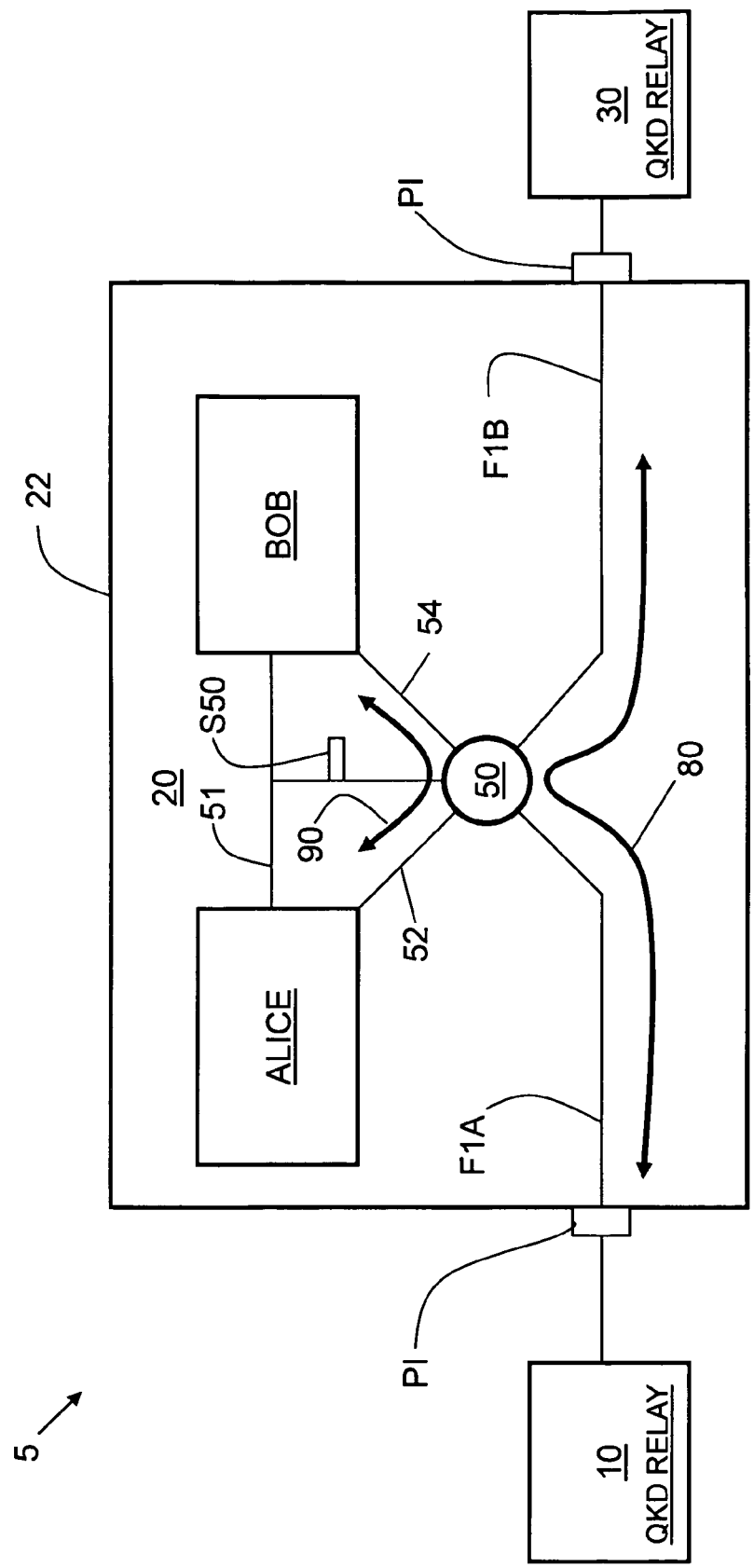
FIG. 4 is a schematic diagram similar to FIG. 3, but wherein with the 2×2 optical switch of QKD box 20 is shown in a second (closed) position that allows for cascaded QKD communication between boxes 10 and 30, while also allowing for a loop-back self-check of Alice and Bob within box 20.

With reference now to FIGS. 3 and 4, a 2×2 optical switch 50 is added to each QKD box 10, 20 and 30 and is optically coupled to input ports PI of each box. In an example embodiment, 2×2 optical switch is a prism-based switch made by Dicon Fiberoptics, such as the optical switch described at: http://www.diconfiberoptics.com/products/scd0009/index.htm. Note that each box 10, and 30 includes the same internal components and that only the internal components of box 20 are shown in detail for ease of illustration.

In an example embodiment, optical switch 50 has a single control input that switches the device between two configurations (states) based on a 0V or 5V input signal S50. In an example embodiment, optical switch 50 is operatively connected to either controller CA and/or controller CB of Alice A or Bob B, respectively, via an electrical line 51. Controller CA or controller CB provides input signal S50 to optical switch 50 to control the network system configuration.

Optical switch 50 has four ports, P1, P2, P3 and P4. Optical switch 50 is connected to Alice via fiber link 52 at port P1 and to Bob via fiber link 54 at port P2. The remaining two ports P3 and P4 are connected to optical fiber sections F1A and F1B, respectively.

Optical switch 50 has two positions, as shown respectively in FIG. 3 and FIG. 4. With reference first to FIG. 3, in a first (open) position, the switch allows for cascaded communication between adjacent boxes in the network, as illustrated by the double-ended arrows 70. In FIG. 3, QKD stations A and B share access to their key databases and are now communicating them to the adjacent QKD boxes 10 and 20, with QKD station A in box 30 communicating with QKD station B in box 10 and QKD station B in box 20 communication with QKD station A in box 30.

With reference to FIG. 4, in a second (closed) position, switch 50 acts to bypass box 20, so that box 10 can communicate directly to box 30 through box 20, as indicated by double-ended arrow 80. At the same time, box 20 can perform diagnostics on its QKD stations A and B without fear of outside interference from the externally accessible fiber links. This optical connection between Alice A and Bob B within QKD relay 20 is referred herein as "loop back," and is indicated by double-ended arrow 90. In the loop-back configuration associated with the second position of optical switch 50, Alice A and Bob B are optical coupled via fiber links 52 and 54 through the optical switch.

In an example embodiment, controllers CA and CB are connected to similar controllers in boxes 10 and 30 (not shown) and coordinate the mode of operation (i.e., the position of optical switch 50). For example, the network may be configured so that on a regular basis optical switch 50 is placed in bypass mode for a given diagnostic time period pre-agreed in the network. After the diagnostic time elapses, optical switch 50 is returned to the position shown in FIG. 3.

In another example embodiment, information about the desired position of optical switch 50 is transmitted from a controller in box 10 (not shown) to controller CA, then via electrical line 51 to controller CB, from controller CB to a controller in box 30 (not shown), etc. Controllers CA and CB can be connected to similar controllers in boxes 10 and 30 (not shown) and coordinate the mode of operation (i.e., the position of optical switch 50). For example, the network may be configured so that on a regular basis optical switch 50 is placed in bypass mode for a given maintenance time period pre-agreed in the network. After the maintenance time elapses, optical switch 50 is returned to the position shown in FIG. 3.

In particular, the diagnostic loop-back testing of the Alice (A) and Bob (B) QKD stations within the QKD relay includes, for example, checking the function of one or more of the various elements (not shown) of each QKD box, such as the output power of the laser, the calibration of both variable optical attenuators (VOA's), confirming the function and calibration of a watchdog detector at Alice, the calibration of the modulators, and the calibration and operation of single photon detectors. All of these functions are normally set during a system turn up. However, when the fiber path is in loop back mode, there is no access to the fiber for an eavesdropper to insert herself into the optical loop.

In an example of performing diagnostic testing in the loop-back configuration, the laser output is calibrated as a function pulse width. This is accomplished, for example, by using a calibrated PIN diode detector pre-installed into the QKD stations, and placing all of the VOAs in each box to minimum attenuation. With a wide laser pulse, each VOA is varied to check the calibration. The average photon level $\mu$ is then calculated and used to calibrate the single-photon detectors.

When QKD relay 20 is added as an extra node, one disadvantage is extra network cost. However, when QKD relay 20 is not bypassed (i.e., when the optical switch is in the first position), the key rate is increased, so that the added cost provides an added benefit. Also, the optical switch can be configured so that when the electronics in one QKD relay totally fail, as in the case of a power failure, the system places the optical switch in the second position so that the failed QKD relay is bypassed without active intervention. Also, the ability to perform diagnostic testing and/or calibration of each box is an important aspect of creating a commercially viable QKD network system.

The present invention allows for two other network redundancies to be realized. With time multiplexing, the same fiber link F1A can be used to connect system 10 to system 20 and to connect system 10 to system 30. Secondly, since multiple boxes work with keys transmitted in the same path, more information is available to remotely determine whether a fault is in a system on the fiber or in the fiber itself.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A QKD cascaded network system comprising:
   a plurality of QKD relays each having two QKD stations Alice and Bob;
   an optical switch in each QKD relay, the optical switch being optically coupled to the Alice and Bob QKD stations within the corresponding QKD relay, and being optically coupled to one or more adjacent QKD relays; and
   wherein the optical switch has a first position that allows for adjacent QKD relays to communicate, and a second position that allows for the two QKD stations Alice and Bob in the corresponding QKD relay to communicate.

2. The system of claim 1, wherein the optical switch is operably coupled to a controller within Alice or Bob, and wherein the optical switch is controlled by a control signal from the controller.

3. A method of operating a QKD cascaded system network, comprising:
   arranging a plurality of QKD relays each having two QKD stations Alice and Bob;
   for each QKD relay, coupling an optical switch to the Alice and Bob QKD stations within the QKD relay;
   coupling the optical switch in each QKD relay to one or more adjacent QKD relays; and
   switching the optical switch from a first position that allows for adjacent QKD relays to communicate, to a second position that allows for the two QKD stations in the corresponding QKD relay to communicate.

4. The method of claim 3, wherein when the optical switch is in the second position, performing diagnostic testing of one or both of the QKD stations within the relay.

5. The method of claim 3, including controlling the position of the optical switch by a control signal from Alice or Bob.

6. A QKD relay apparatus with loop-back capability for use in a network of QKD relays having first and second QKD relays, the QKD relay apparatus comprising:
   a first QKD station Alice;
   a second QKD station Bob optically coupled to Alice;
   a four-port optical switch having first, second third and fourth optical ports, wherein Alice and Bob are optically coupled to the first and second optical ports respectively, and wherein the third and fourth optical ports are adapted to be coupled to the first and second QKD relays; and
   wherein the optical switch has a first position that allows for the first and second QKD relays to communicate with Alice and/or Bob, and a second position that allows for the first and second QKD relays to communicate directly with each other.

7. The QKD relay apparatus of claim 6, further including the first and second QKD relays so as to form a QKD cascaded network system.

8. The QKD relay apparatus of claim 6, including controlling the position of the optical switch via a control signal from Alice or Bob.

9. The QKD relay apparatus of claim 6, adapted to perform diagnostic testing and/or self-calibration when the optical switch is in the second position.

10. The QKD relay apparatus of claim 9, further including a tamper-proof enclosure.

* * * * *